Figure 3:
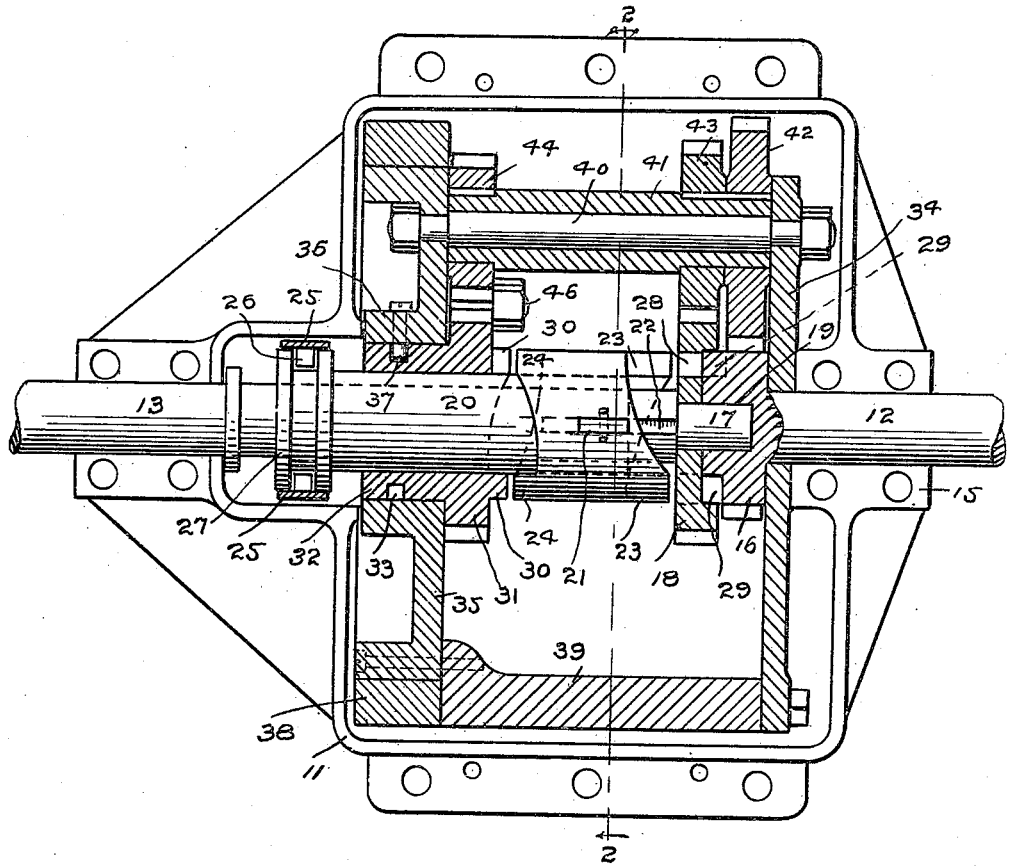

G. B. PILKINGTON.
TRANSMISSION GEARING.
APPLICATION FILED JULY 1, 1910.
990,386.
Patented Apr. 25, 1911.
2 SHEETS—SHEET 1.
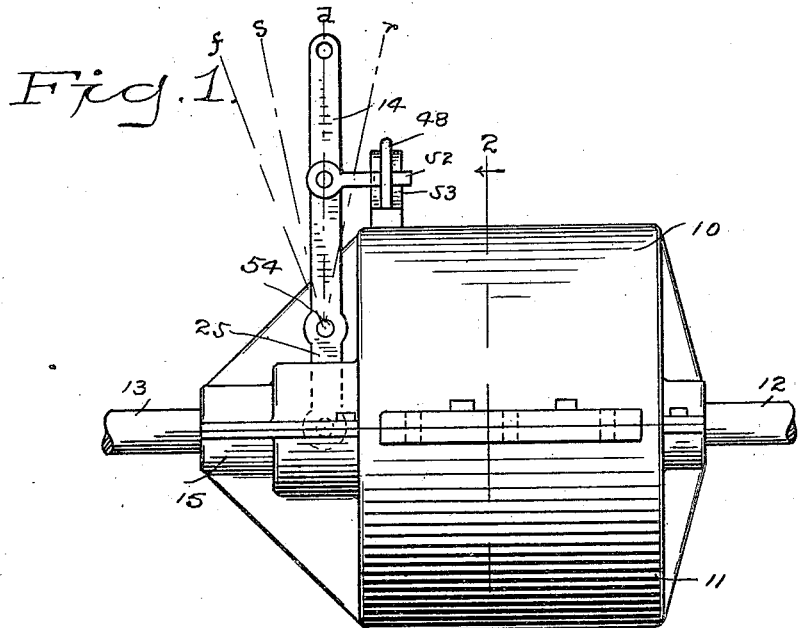
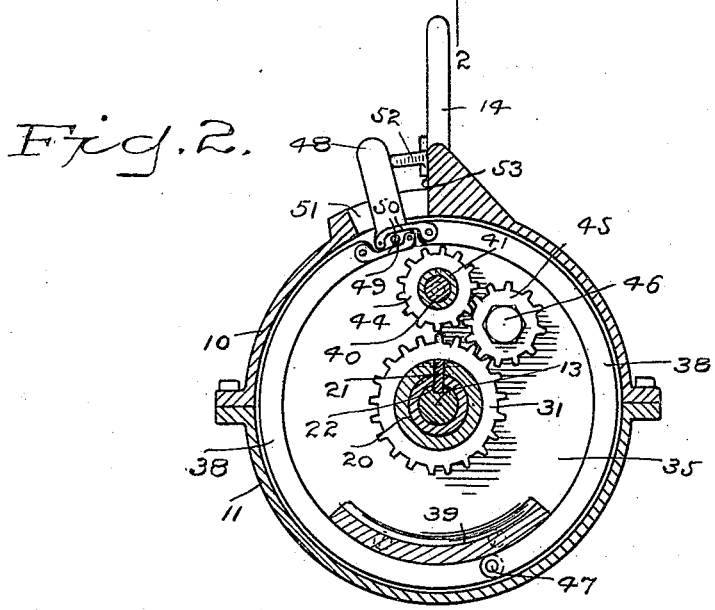
WITNESSES:
H. A. Lamb.
S. W. Atherton.
INVENTOR
George B. Pilkington
BY
A. Wooster
ATTORNEY

G. B. PILKINGTON.
TRANSMISSION GEARING.
APPLICATION FILED JULY 1, 1910.

990,386.

Patented Apr. 25, 1911.
2 SHEETS—SHEET 2.

WITNESSES:
H. A. Lamb.
S. W. Atherton.

INVENTOR
George B. Pilkington
BY
A. M. Wooster
ATTORNEY

UNITED STATES PATENT OFFICE.

GEORGE B. PILKINGTON, OF WATERBURY, CONNECTICUT.

TRANSMISSION-GEARING.

990,386.

Specification of Letters Patent. Patented Apr. 25, 1911.

Application filed July 1, 1910. Serial No. 569,906.

*To all whom it may concern:*

Be it known that I, GEORGE B. PILKINGTON, a citizen of the United States, residing at Waterbury, county of New Haven, State of Connecticut, have invented an Improvement in Transmission-Gearing, of which the following is a specification.

This invention has for its object to provide transmission gearing adapted for use in connection with driving and driven shafts in machinery generally and in motor cars, motor boats, etc., which shall provide slow and fast speeds ahead, disconnect the shafts and provide a reverse by movements of a lever, which shall be quick and certain in action, strong and durable and in which danger of breakage of the parts under the severest conditions of use shall be practically eliminated.

With these and other objects in view I have devised the novel transmission gearing which I will now describe, referring to the accompanying drawings forming a part of this specification and using reference characters to indicate the several parts.

Figure 4:
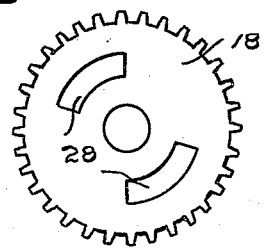

Figure 1 is an elevation of my novel structure as in use, the operating lever being in position to disconnect the driven shaft; Fig. 2 a section on the line 2—2 in Figs. 1 and 3, looking in the direction of the arrows; Fig. 3 a horizontal section on an enlarged scale, the upper part of the casing being removed; and Fig. 4 is an elevation of one of the gear wheels detached.

10 and 11 denote the parts of the casing, which is of suitable shape to inclose the mechanism, the parts being rigidly secured together.

12 denotes the driving shaft, 13 the driven shaft and 14 the operating lever. The shafts are journaled in alinement in bearings 15 formed in the parts of the casing. At the inner end of the driving shaft and rigidly secured thereto is a gear wheel 16. The driven shaft has an inner reduced end 17 on which a gear wheel 18 is mounted to rotate and which is itself free to rotate in a socket 19 in gear wheel 16 by which that end of the shaft is supported.

20 denotes an operating sleeve which is adapted to move longitudinally on the driven shaft and is secured thereto by a key 21 which engages a slot 22 in the driven shaft, the key permitting free longitudinal movement of the sleeve but holding it against rotation relatively to the driven shaft.

23 denotes dogs formed upon or rigidly secured to the sleeve and facing toward the right, as seen in Fig. 3, and 24 dogs formed upon or rigidly secured to said sleeve and facing toward the left. Dogs 23 are adapted to engage gear wheels 18 and 16 and to transmit motion from either of said gear wheels to the operating sleeve and driven shaft, as will be more fully explained. The operating lever is provided with a yoke 25 having pins 26 which engage a grooved collar 27 on the sleeve to move it longitudinally on the driven shaft. Gear wheel 18 is provided with openings 28. When dogs 23 are moved into engagement with these openings, but not through them, motion will be communicated from gear wheel 18 to the sleeve and driven shaft, this being the slow speed. When dogs 23 are moved farther toward the right, as seen in Fig. 3, and are passed through openings 28 and into engagement with lugs 29 on gear wheel 16, the motion of the driving shaft will be transmitted directly to the operating sleeve and the driven shaft, this being the fast speed. Dogs 24 are adapted, when the sleeve is moved toward the left, as seen in Fig. 3, to engage lugs 30 on a gear wheel 31 which is mounted to rotate on the operating sleeve, and is provided with a hub 32 having a peripheral groove 33. The engagement of dogs 24 with lugs 30 produces the reverse movement, as will be more fully explained.

34 denotes a disk mounted independently on the driving shaft between gear wheel 16 and the contiguous bearing, which at the fast speed rotates with said shaft.

35 denotes a brake wheel mounted independently on the hub 32 of gear wheel 31. The hub 36 of the brake wheel is provided with a pin 37 which engages groove 33 in hub 32 and holds the brake wheel against displacement.

38 denotes a brake band which is secured to the casing and encircles the brake wheel and 39 a weight lying between disk 34 and the brake wheel and rigidly secured to both.

40 denotes a cross rod lying between disk 34 and the brake wheel opposite to the weight and rigidly secured to both, and 41 a sleeve axle mounted to rotate on said rod.

42, 43 and 44 denote gear wheels rigidly secured to the sleeve axle. Gear wheel 42 meshes with gear wheel 16 which is rigidly secured to the driving shaft, gear wheel 43 meshes with gear wheel 18 which is mounted to rotate on the driven shaft and gear wheel 44 meshes with an idler 45 mounted to rotate on a stud 46 extending from the inner face of the brake wheel, said idler in turn meshing with gear wheel 31 which is mounted to rotate on operating sleeve 20. I have shown the brake band as made in two parts which are pivoted on a stud 47 extending from the casing.

48 denotes the brake lever which is pivoted to part 10 of the casing as at 49.

50 denotes links which connect the respective ends of the brake band with the brake lever, each link being curved about the pivot or fulcrum of the lever and being connected to said lever on the side of the pivot opposite to the end of the band to which it is connected so that movement of the brake lever in one direction will act on both ends of the band and cause the band to grip the brake wheel, and movement of the brake lever in the opposite direction will relieve the grip of the band on the brake wheel. The brake lever extends through an opening 51 in part 10 of the casing and is operated by means of a wedge 52 which is carried by and extends laterally from operating lever 14, an abutment 53 being provided on one side of opening 51 against which the back of the wedge bears. The operating lever has its fulcrum on part 10 of the casing as at 54. When the operating lever is swung toward the right, as seen in Fig. 1, the operating sleeve will be moved toward the left, as in Fig. 3, dogs 24 will be placed in engagement with lugs 30 and wedge 52 will move the brake lever toward the left, as seen in Fig. 2, causing the brake band to grip the brake wheel.

The operation is as follows: In the position of the parts shown in the drawings, the shafts are disconnected and the driving shaft may be run without effect on the driven shaft. Suppose now that it is desired to reverse. The operating lever is swung toward the right from the position shown in Fig. 1, to place dogs 24 in engagement with lugs 30 on gear wheel 31. This movement, through the wedge and brake lever also causes the brake band to grip the brake wheel, the effect of which is to hold the brake wheel, disk 34 and the weight stationary. Motion is now transmitted to gear wheel 31 in the reverse direction from the driving shaft, and as the lugs on gear wheel 31 are in engagement with dogs 24 on the operating sleeve which is keyed to the driven shaft, reverse motion is transmitted to the driven shaft. The operation of the gearing is as follows: Gear wheel 16 on the driving shaft which is in mesh with gear wheel 42 on sleeve axle 41 transmits motion to said sleeve axle and gear wheels 43 and 44 carried thereby. Gear wheel 43 simply transmits motion to gear wheel 18 which turns freely on the inner end of the driven shaft. Gear wheel 44 meshes with idler 45 which in turn meshes with gear wheel 31 which now carries the operating sleeve and driven shaft. Suppose now that it is desired to produce the slow speed forward. The operating lever is swung from its position toward the right an equal distance toward the left from the normal or disconnecting position. This movement disengages dogs 24 from lugs 30 on gear wheel 31 and causes dogs 23 to enter but not to pass through openings 28 in gear wheel 18. Gear wheel 16 now drives gear wheel 42 on the sleeve axle, and gear wheel 43 on the sleeve axle drives gear wheel 18, the operating sleeve and the driven shaft in the same direction that the driving shaft is rotating but at a reduced speed owing to the fact that gear wheel 42 is larger than gear wheel 16 by which it is driven and gear wheel 18 is larger than gear wheel 43 by which it is driven. Gear wheel 31 now rotates freely in the reverse direction on the operating sleeve, pin 37 sliding freely in the groove in hub 32. In practice, the wedge and the brake lever are so proportioned and arranged that the brake band has sufficient frictional engagement with the brake wheel to hold said wheel against rotation in the reverse, the disconnected and the slow speed positions of the operating lever. Suppose now that the fast speed is desired. The operating lever is moved from the slow speed position still farther toward the left, causing dogs 23 on the operating sleeve to pass through openings 28 in gear wheel 18 and to engage lugs 29 on gear wheel 16, and the engagement of the brake band with the brake wheel is wholly relieved. Gear wheel 18 is now locked against rotation independently of gear wheel 16, and gear wheel 16 is engaged with the operating sleeve and the driven shaft. The result is that the speed of the driving shaft is transmitted directly to the driven shaft, gear wheels 18, 42, 43, 44 and 31 and idler 42 are locked, and disk 34, the brake wheel, weight, sleeve axle and gear wheels together form a balance wheel which rotates with the shafts, the sleeve axle and the gear wheels carried thereby being counterbalanced by the weight.

In Fig. 1, I have indicated the several positions of the operating lever by dotted lines, the disconnected position (as in full lines) being indicated by $d$, the reverse position by $r$, the slow speed forward by $s$, and the fast speed by $f$. In practice, the operating lever is provided with the usual spring latch engaging a segment rack, which are not illustrated as specifically they form no portion of the present invention.

Having thus described my invention I claim:

1. In combination, driving and driven shafts, a gear wheel 16 carried by the driving shaft, a gear wheel 18 mounted to rotate on the driven shaft, an operating sleeve keyed to the driven shaft and longitudinally movable thereon, a gear wheel 31 mounted to rotate on said sleeve and having a hub, a brake wheel mounted independently on said hub, a disk mounted independently on the driving shaft, a cross rod connecting the disk and the brake wheel, a sleeve axle mounted to rotate on the cross rod, gear wheels carried by said axle and meshing respectively with gear wheels 16 and 18 and an idler which meshes with gear wheel 31, a brake band adapted to engage the brake wheel and means upon the operating sleeve for engaging gear wheel 31 to produce reverse motion and for engaging gear wheel 18 to produce slow speed and gear wheel 16 to produce fast speed.

2. The combination with a driving shaft, a gear wheel carried thereby, a driven shaft, a gear wheel mounted to rotate thereon, an operating sleeve keyed to the driven shaft and longitudinally movable thereon, a gear wheel mounted to rotate on said sleeve and a brake wheel mounted independently on the hub of said gear wheel, of a disk mounted to rotate on the driving shaft, an axle mounted between the brake wheel and the disk, gear wheels on said axle engaging the other gear wheels, means on the operating sleeve for engaging the first mentioned gear wheels to produce reverse movement and slow and fast speed of the driven shaft, a brake band adapted to engage the brake wheel, an operating lever and means intermediate said lever and the brake band for operating the latter.

3. The combination with a driving shaft, a gear wheel carried thereby, a driven shaft, a gear wheel mounted to rotate thereon, an operating sleeve keyed to the driven shaft and longitudinally movable thereon, a gear wheel mounted to rotate on said sleeve and a brake wheel mounted independently on the hub of said gear wheel, of a disk mounted to rotate on the driving shaft, an axle mounted between the brake wheel and the disk, gear wheels on said axle engaging the other gear wheels, means on the operating sleeve for engaging the first mentioned gear wheels to produce reverse movement and slow and fast speed of the driven shaft, a brake band adapted to engage the brake wheel, a brake lever, links connecting the ends of the brake band with the brake lever, an operating lever and operating connections between said levers.

4. The combination with a casing having an opening with an abutment on one side thereof, a driving shaft, a gear wheel carried thereby, a driven shaft, a gear wheel mounted to rotate thereon, an operating sleeve keyed to the driven shaft and longitudinally movable thereon, a gear wheel mounted to rotate on said sleeve and a brake wheel mounted independently on the hub of said gear wheel, of a disk mounted to rotate on the driving shaft, an axle mounted between the brake wheel and the disk, gear wheels on said axle engaging the other gear wheels, means on the operating sleeve for engaging the first mentioned gear wheels to produce reverse movement and slow and fast speed of the driven shaft, a brake band adapted to engage the brake wheel, a brake lever, links connecting the ends of the brake band with the brake lever, an operating lever and a wedge carried by the operating lever and bearing against the abutment by which the brake lever is operated.

5. The combination with a casing, driving and driven shafts journaled therein in alinement, an operating sleeve keyed to the driven shaft and longitudinally movable thereon, a gear wheel carried by the driving shaft, a gear wheel mounted to rotate on the driven shaft, a gear wheel mounted to rotate on the operating sleeve and a brake wheel mounted independently on the hub of said gear wheel, of a disk mounted independently on the driving shaft, means for connecting said disk and the brake wheel, an idler engaging the gear wheel on the operating sleeve, gear wheels carried by said disk and the brake wheel which engage respectively the gear wheels on the shafts and the idler, a brake band engaging the brake wheel and a lever by which the operating sleeve and brake band are operated.

6. The combination with a casing, driving and driven shafts journaled therein in alinement, an operating sleeve keyed to the driven shaft and longitudinally movable thereon, a gear wheel carried by the driving shaft, a gear wheel mounted to rotate on the driven shaft and having openings therein, a gear wheel mounted to rotate on the operating sleeve and a brake wheel mounted independently on the hub of said gear wheel, of a disk mounted independently on the driving shaft and connected to the brake wheel, an idler engaging the gear wheel on the operating sleeve, gear wheels carried by said disk and brake wheel which engage respectively the gear wheels on the shafts and the idler, dogs on the operating sleeve to engage the gear wheel mounted thereon, other dogs on said sleeve to engage the openings in the gear wheel mounted to rotate on the driven shaft and to pass through said openings and engage the gear wheel carried by the driving shaft, a brake band engaging the brake wheel and a lever by which the operating sleeve and brake band are operated.

7. The combination with a driving shaft, a gear wheel on said shaft, a driven shaft, a gear wheel mounted to rotate thereon, an operating sleeve keyed to the driven shaft and longitudinally movable thereon, a gear wheel mounted to rotate on said sleeve, a brake wheel mounted independently on the hub of said gear wheel and means on the operating sleeve for engaging the gear wheel mounted thereon and for engaging either or both of the gear wheels on the shafts, of a disk mounted independently on the driving shaft, a weight and a cross rod between said disk and the brake wheel, an idler engaging the gear wheel on the operating sleeve, gear wheels mounted on said cross rod and engaging respectively the gear wheels on the shafts and the idler, a brake band and means for operating said sleeve and the brake band simultaneously.

8. The combination with a driving shaft, a gear wheel carried thereby, a driven shaft, a gear wheel mounted to rotate thereon and having openings therein, an operating sleeve keyed to the driven shaft and longitudinally movable thereon, a gear wheel mounted to rotate on said sleeve and dogs upon said sleeve adapted to engage the gear wheel mounted thereon or to engage the openings in the gear wheel on the driven shaft or to pass through said openings and engage the gear wheel on the driving shaft, of a disk mounted independently on the driving shaft, a brake wheel, means for connecting said disk and the brake wheel, gear wheels carried by the disk and the brake wheel which operate the driven gear wheels, a brake band engaging the brake wheel, an operating lever and connections between said lever and the operating sleeve and the brake band.

In testimony whereof I affix my signature in presence of two witnesses.

GEORGE B. PILKINGTON.

Witnesses:
  GEO. R. SNAGG,
  J. S. BOTTOMLEY.

---

Copies of this patent may be obtained for five cents each, by addressing the "Commissioner of Patents, Washington, D. C."